July 14, 1970 P. H. EVANS 3,520,540

PICKUP ARM SPINDLE BEARINGS FOR RECORD PLAYERS

Filed Feb. 9, 1968

Inventor
PHILIP HENRY EVANS
By Kurt Kelman
AGENT 3,520,540
Patented July 14, 1970

3,520,540

PICKUP ARM SPINDLE BEARINGS FOR RECORD PLAYERS

Philip H. Evans, Stourbridge, England, assignor to BSR Limited, Warley, England, a British company Filed Feb. 9, 1968, Ser. No. 704,360
Claims priority, application Great Britain, Feb. 11, 1967, 6,637/67
Int. Cl. G11b *3/10*
U.S. Cl. 274—23 5 Claims

ABSTRACT OF THE DISCLOSURE

In a record player having a base plate and a pickup arm carried on a vertical spindle a support means for the vertical spindle to reduce friction in the support means. The support means comprising an arm carried below the base plate of the record player and having a recess in which the lower end of the vertical spindle is engaged, and there being a Z-shaped leaf spring acting between the undersurface of this arm and the spindle. There is a support for the upper end of the vertical spindle which prevents only a lateral movement thereof.

BACKGROUND OF THE INVENTION

This invention relates to record players for disc records and is concerned with apparatus of the type having a pickup arm mounted at its one end at the upper end of a vertical spindle for movement about a vertical axis for tracking when playing a record, and also capable of movement about a horizontal axis at the mounted end for the purpose of raising and lowering the stylus which is carried at the other end of the pickup arm away from and into engagement with the record respectively. Such record players will be referred to hereinafter as "of the type described."

The tendency at present is to require very much lower playing weights for the stylus and, for example, a playing weight of 2 grammes or less is now being required as compared with a playing weight of around 6 grammes which has been commonly accepted hitherto. This requirement for such lower playing weight for a stylus makes it very important in the pickup arm assembly to reduce to the minimum frictional resistance to movement of the pickup about its vertical axis and this means reducing to the minimum the frictional resistance encountered in the bearings and supports for the vertical spindle of the pickup arm.

SUMMARY OF THE INVENTION

The object of this invention is to provide a new or improved record player of the type described having an improved arrangement for the mounting of the vertical spindle of the pickup arm of a record player of this type so as to reduce to a minimum the frictional resistance to movement of the pickup arm about its vertical axis.

According to the invention there is provided a record player, of the type described, including support means for the vertical spindle of the pickup arm comprising a lower bearing support which is rigid with the fixed base plate of the apparatus and which has a bearing surface engaging freely with a bearing surface on the lower end of the pickup arm spindle so as to support the spindle from below, an upper support for the pickup arm spindle which provides only for support thereof against displacement in directions transverse to the vertical axis of the spindle and permitting free rotation of the spindle in relation to said upper support and light spring means acting between said lower bearing support and the spindle to maintain the lower end of the spindle against displacement away from said lower bearing support.

BRIEF DESCRIPTION OF THE DRAWINGS

One embodiment of the invention will now be described in more detail by way of example with reference to the accompanying drawings wherein.

DESCRIPTION OF THE PREFERRED EMBODIMENT

Figures 1, 2, 3:
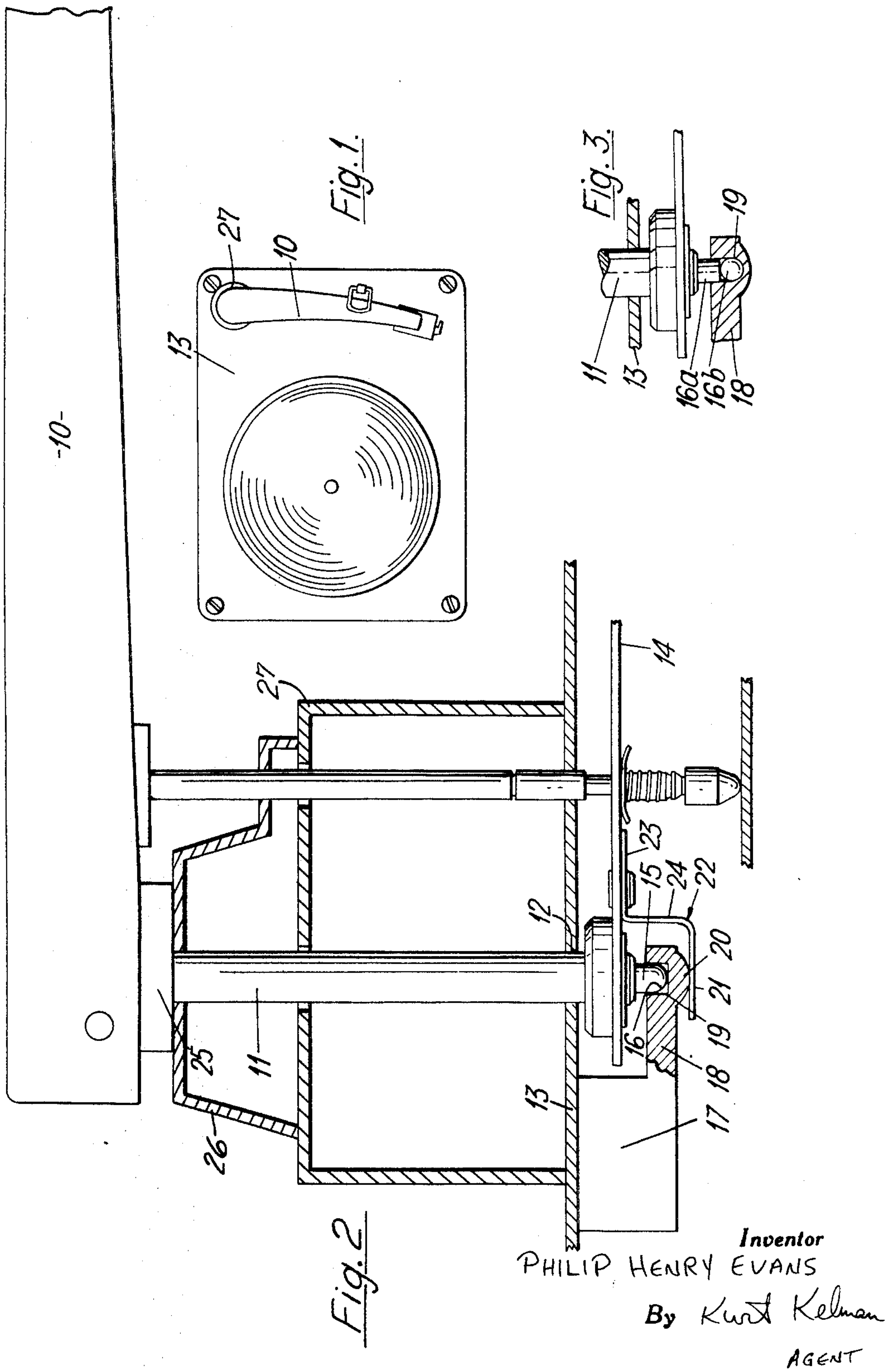
FIG. 1 shows diagrammatically and in plan view a record player according to the invention.
FIG. 2 shows, diagrammatically and in side elevation, to an enlarged scale and partly in section part of the record player of FIG. 1.
FIG. 3 shows an alternative form of bearing in side elevation, partly in section and to an enlarged scale.

In this example, the pickup arm is indicated generally at 10 and may be of generally known construction suitable for light weight playing, although a preferred form of pickup arm is that described in Pat. No. 3,384,389, having improved means for adjusting the balance of the arm about its horizontal axis of movement so as to enable the playing weight of the arm to be adjusted accurately over the range between the minimum and maximum playing weights required. A detailed description of the pickup arm and its horizontal axis mounting is not given herein as the present invention is concerned only with the vertical spindle 11 thereof.

The vertical spindle 11 passes at its lower end through a clearance hole 12 in the fixed base plate 13 of the record player and immediately below the base plate 13 has fixed thereto a quadrant selector plate 14 which, therefore, moves with the vertical spindle 11 and the function of which is well known and does not require further description herein.

Immediately below the position at which the selector plate 14 is fixed the vertical spindle 11 has a short downwards extension 15 of reduced cross section as compared with the cross section of the major part of its length and this short extension 15 has its lower end 16 formed to substantially convex configuration so as to provide a bearing surface at the lower end of the vertical spindle 11.

The support means for the lower end 16 of the spindle 11 comprises a block 17 fixed to the underside of the fixed base plate 13 of the record player at a position adjacent the lower end of the vertical spindle and having an arm 18 projecting horizontally below the lower end 16 of the spindle 11. This arm 18 is provided with a vertically extending pocket 19 in which the short extension 15 of the spindle 11 engages freely with its convex bearing surface running freely on the substantially flat surface at the bottom of said pocket.

On the underside of the horizontally extending arm 18 there is a downwardly extending projection 20 also of substantially convex configuration and this surface is engaged by one limb 21 of a support spring 22 which is in the form of a Z-spring plate, the said one limb 21 of which engages with and below the convex projection 20 on the under side of the horizontal arm 18 and the other, parallel, arm 23 of which is secured to the under side of the quadrant selector plate 14 with the third arm 24 connecting these two arms 21 and 23 being arranged substantially vertically so that this support spring acts to maintain the lower end 16 of the pickup arm vertical spindle 11 in its lower bearing support 19 under a light spring pressure which is selected as the minimum required to maintain the spindle 11 against displacement upwardly during normal operation of the record player.

Near its upper end the vertical spindle 11 has upper support means in the form of an aperture provided in a collar, indicated generally at 25, or other annular member, fixed relative to the base plate 13. The collar 25 is carried on support bracket 26 mounted on the top of boss 27. The peripheral edge of the aperture is reduced to minimum dimensions so as to provide the minimum area of contact at this position between the surface of the spindle 11 and this upper support. Thus at this position frictional resistance to turning of the spindle is kept to a minimum and the upper support 25 serves only to maintain the spindle 11 against sideways or transverse displacement.

During operation of the record player the Z-shaped support spring 22, which turns with the quadrant selector plate 14, provides only minimum frictional resistance as its arm 21 which engages the lower bearing support is making little more than point contact with the convex projection 20 on the underside of the arm 18 of the bearing support 17 which supports the lower end 16 of the vertical spindle 11.

In the above described arrangement frictional resistance to turning movement of the pickup arm has been reduced to the minimum to satisfy the requirements for minimum frictional resistance when using the low playing weight for the pickup arm stylus.

In an alternative arrangement, shown in FIG. 3, the downward extension 15 of the spindle 11 is formed with an end surface 16*a* which extends normally to the longitudinal axis of the spindle 11. The end 16*a* engages a spherical ball 16*b* provided in the pocket 19 of the arm 18, thereby reducing friction between the spindle 11 and the pocket 19. The other features of the bearing are the same as described hereinbefore.

What I claim then is:

1. A record-player having a base plate and a pickup arm carrying a stylus at one end thereof, the pickup arm being pivotally connected, at a position spaced from said stylus, to a vertical spindle, for movement about a horizontal axis, and support means for said vertical spindle supporting said spindle on said base plate for pivotal movement about the longitudinal axis thereof, said support means comprising a lower bearing support, carried by said base plate and said lower bearing support having a bearing surface in engagement with a co-operating bearing surface provided on the lower end of said vertical spindle to support said spindle from below, an upper support for the vertical spindle, said upper support providing only support for the vertical spindle against displacement in directions transverse to the vertical axis of the spindle and permitting free rotation of the spindle in relation to said upper support, wherein the improvement comprises said lower bearing support comprising an arm fixed to and extending below said base plate and having a generally cylindrical recess therein, the base of the recess being engaged by said lower end of said spindle and there being a leaf spring of generally Z configuration acting between said spindle and said arm, one of the two parallel limbs of said spring being secured to a quadrant plate provided on said spindle and the other limb of the spring engaging the under surface of said arm.

2. A record player according to claim 1 wherein said other limb of said spring engages a projection on the underside of said arm.

3. A record player according to claim 1 wherein the lower end of said vertical spindle is of convex configuration to provide a bearing surface for engagement with the bearing surface of said lower bearing support.

4. A record-player according to claim 1, wherein a ball is interposed between the lower end of said spindle and said bearing surface provided on said lower bearing support, said ball providing said cooperating bearing surface provided on the lower end of said spindle.

5. A record-player according to claim 4, wherein the lower end of said spindle is flat and extends normal to the longitudinal axis thereof to provide a surface to engage said ball.

References Cited

UNITED STATES PATENTS

| | | | |
|---|---|---|---|
| 1,263,279 | 4/1918 | Parnall | 274—23 |
| 2,577,051 | 12/1951 | Voegtlin et al. | 274—23 |
| 2,587,677 | 3/1952 | Ammlung | 274—23 |
| 3,093,379 | 6/1963 | Fabel et al. | 274—23 |

FOREIGN PATENTS

| | | |
|---|---|---|
| 952,474 | 11/1956 | Germany. |
| 1,135,195 | 8/1962 | Germany. |
| 1,182,445 | 11/1964 | Germany. |

HARRY N. HAROIAN, Primary Examiner